United States Patent [19]

Chu

[11] Patent Number: 4,847,055

[45] Date of Patent: Jul. 11, 1989

[54] PROCESS FOR ZSM-11 PRODUCTION

[75] Inventor: Yung F. Chu, Plainsboro, N.J.

[73] Assignee: Mobil Oil Corporation, New York, N.Y.

[21] Appl. No.: 124,652

[22] Filed: Nov. 24, 1987

Related U.S. Application Data

[63] Continuation-in-part of Ser. No. 905,102, Sep. 8, 1986, abandoned.

[30] Foreign Application Priority Data

| Apr. 29, 1986 | [EP] | European Pat. Off. ........ 86303223.1 |
| Apr. 29, 1986 | [NZ] | New Zealand ........................ 215987 |
| May 2, 1986 | [AU] | Australia ............................ 57042/86 |
| May 8, 1986 | [AR] | Argentina ............................... 303893 |
| May 8, 1986 | [CA] | Canada .................................. 508701 |
| May 12, 1986 | [BR] | Brazil ......................... PI 8602130[U] |
| May 13, 1986 | [DK] | Denmark ............................. 2205/86 |
| May 13, 1986 | [JP] | Japan .................................. 61-107809 |
| May 14, 1986 | [ZA] | South Africa ....................... 86/3580 |

[51] Int. Cl.⁴ ............................................. C01B 33/28
[52] U.S. Cl. .................................................... 423/328
[58] Field of Search ....................... 423/326, 328, 329; 502/60, 77

[56] References Cited

U.S. PATENT DOCUMENTS

| Re. 28,341 | 2/1975 | Wadlinger et al. ................. 423/329 |
| 3,308,069 | 3/1967 | Wadlinger et al. ................. 423/328 |
| 3,709,979 | 1/1973 | Chu ..................................... 423/328 |
| 4,175,114 | 11/1979 | Plank et al. ......................... 423/329 |
| 4,431,621 | 2/1984 | Taramasso et al. ................. 423/329 |
| 4,530,824 | 7/1985 | Arika et al. ......................... 423/328 |
| 4,539,304 | 9/1985 | Field ..................................... 502/66 |
| 4,552,856 | 11/1985 | Tauster et al. ....................... 502/74 |
| 4,562,055 | 12/1985 | Arika et al. ......................... 423/329 |
| 4,687,654 | 8/1987 | Taramasso et al. ................. 423/329 |

FOREIGN PATENT DOCUMENTS

| 0164939 | 12/1985 | European Pat. Off. ............ 423/328 |
| 0173895 | 3/1986 | European Pat. Off. . |
| 0173901 | 3/1986 | European Pat. Off. . |
| 0187522 | 7/1986 | European Pat. Off. ............ 423/328 |
| 0202797 | 11/1986 | European Pat. Off. . |
| 2116450B | 9/1983 | United Kingdom . |

*Primary Examiner*—John Doll
*Assistant Examiner*—R. Bruce Breneman
*Attorney, Agent, or Firm*—Alexander J. McKillop; Charles J. Speciale; Marina V. Schneller

[57] ABSTRACT

A process for producing zeolite beta is described by employing in the reaction mixture a source of silicon which has a particle size of 1 to 500, and controlling the purity of the product by controlling the amount of tetraethylammonium cation in the reaction mixture.

8 Claims, No Drawings 4,847,055

PROCESS FOR ZSM-11 PRODUCTION

CROSS REFERENCE TO RELATED APPLICATIONS

This application is a continuation-in-part of Ser. No. 905,102, filed Sept. 8, 1986, now abandoned.

FIELD OF THE INVENTION

The invention relates to the synthesis of zeolite beta. A new method which relies on a particular source of silicon, a source of alumina, and TEABr (tetraethylammoniumbromide) is described. High yields of zeolite beta can be achieved. Control of the purity of the zeolite beta product is achieved by controlling the TEA-$_2$O/SiO$_2$ ratio.

Zeolite beta is described in U.S. Pat. No. 3,308,069 and Re 28,341, each of which is incorporated by reference herein. The X-ray diffraction patterns of zeolite beta, the "fingerprint" identification of a zeolite, described in said patents is particularly incorporated by reference herein.

SUMMARY OF THE INVENTION

In accordance with the invention, zeolite beta can be produced in high yield and of purity of about 100%, when a particular source of silicon is used in a reaction mixture together with TEABr.

DETAILED DESCRIPTION OF THE INVENTION

In accordance with the invention, the zeolite beta synthesis requires a particular amorphous silicon source, in the zeolite synthesis reaction mixture which allows high solids loading in the reaction mixture. "Loading" in the synthesis reaction mixture is defined by the fraction $$\frac{\text{Weight of Silica and Alumina}}{\text{Weight of Total Reaction Mixture}}$$

and "% loading" is defined by multiplying that fraction by 100%, i.e., $$100\% \times \frac{\text{Weight of Silica and Alumina}}{\text{Weight of Total Reaction Mixture}}$$

Generally, the percent loading will be greater than 15%. Practically the % loading, in accordance with the invention, will exceed 20% and preferably will be at least about 30%. These high loadings maximize the zeolite yield per reaction mixture.

This high loading can be achieved by providing a source of silicon which has been formed by continuously precipitating that source of silicon for the zeolite synthesis. That continuous precipitation allows for the provision of a silicon containing precipitate, the particle size of the precipitate ranging from 1 to 500 microns, which exceeds that particle size at which silica gel formation is possible.

The precipitate, the source of silicon in the zeolite beta synthesis, is formed from a solution of a soluble silicon source. Conveniently, the solution is an aqueous solution of a pH ranging from 9 to 12. The source of soluble silicon can be any soluble silicate and is preferably sodium silicate. The precursor is formed by continuous precipitation from the solution phase. Accordingly, precipitation comprises initiating precipitation and maintaining said precipitation. More particularly, the precipitation step is continuous. Alteration of the composition of the solution of soluble silicon source is undertaken by introducing a precipitating reagent. In one embodiment, the precipitating reagent is a source of acid. Thus, the precipitating reagent can be an acid solution. The acid of the solution may be any mineral acid, such as H$_2$SO$_4$, HCl, HNO$_3$, etc. The acid solution can have a pH ranging from essentially 0 to about 6. Thus, in one embodiment precipitation can be effected by acid neutralization of a basic solution of a silicate.

In one of the two alternative embodiments, the soluble silicon source, e.g., silicate, can be precipitated alone in the absence of sources of other zeolitic framework elements. In this embodiment, both the precipitating reagent and the solution of silicate can be free of intentionally added alumina or alumina source. That is, no aluminum is deliberately added to the precipitation reaction mixture, in this embodiment; however, aluminum is ubiquitous and the presence of such a material in minor amounts is due to impurities in the precursors of the reactants or impurities extracted from the reaction vessel; thus, when no source of alumina is added in the alternative embodiment, the amount of alumina in the precipitate generally will be less than about 0.5 and generally lower than 0.2 weight percent. The foregoing embodiment is preferred at this time for the reason that it allows greater flexibility in varying the ratios of zeolite elemental components in the zeolite product realized during the crystallization stage in which the silicate is subjected to zeolite production. However, precipitation can be coprecipitation in the presence of soluble sources of other zeolite framework elements including gallium, indium, boron, iron and chromium. The soluble source of these other zeolitic framework components can be, e.g., nitrates. The coprecipitation product would be an amorphous, e.g., gallo-silicate, boro-silicate, ferrosilicate. Alternatively, soluble sources of gallium, indium, boron, iron and/or chromium can be added with the precipitated silica precursor to the zeolite crystallization stage.

Continuous precipitation of the amorphous silicon zeolite precursor comprises continuously introducing the solution of soluble silicon source and continuously introducing the precipitating reagent to a reaction zone while maintaining a molar ratio of silica source to precipitating reagent substantially constant. In one embodiment, the precipitating reagent and the silicate source are introduced simultaneously into the reaction zone.

The precipitate precursor comprises agglomerated solids in the shape of microspheres. Suspensions of these particles exhibit low viscosities at high solids loadings in subsequent processing, including zeolite synthesis, for example, even at solids loading equal to or greater than 20-30% and even at 35% solids. This is in marked contrast to non-controlled neutralization which results in a solid, non-stirrable mass. In accordance with the invention, the particle size of the silica precipitate ranges between 1–500$\mu$ but the average size is 50–100$\mu$.

Other conditions affecting precipitation include time, pH and temperature. The temperature of the precipitation mixture can range from 80° to 300° F. (about 27° C. to 150° C.). The time of contact of the solution of silicon source and the precipitating reagent can range from about 10 minutes to several hours at pH maintained from about 6 to 11. Generally, the precipitate is processed by isolating it, eg., by filtration, and removing soluble contaminants therefrom, by washing and/or ion exchange. This stage can be considered a solids consolidation step. The solids consolidation step can comprise filtering the amorphous product to a solids content of 30–50% before shearing. No additional water is needed; however, a small amount of water can be added to adjust the solids content or increasing the fluidity of the slurry for easier transport.

Use of that source of silicon in the zeolite beta crystallization of the invention can be either in a batch or continuous process. The zeolite beta synthesis reaction mixture has a composition in terms of molar ratio of oxides as follows:

$SiO_2/Al_2O_3$: greater than about 10 to 200,
$H_2O/TEA_2O$: about 20 to 150,
$Na_2O/TEA_2O$: about 0.01 to 1.0,
$TEA_2O/SiO_2$: about 0.01 to 1,
seeds: 0 to 10% (weight), wherein seeds can be crystals of zeolite beta and wherein TEA is tetraethylammonium provided by tetraethylammoniumbromide.

If the zeolite beta is to contain alumina (or gallium, indium, boron, iron and/or chromium) in appreciable amounts the aluminum source is preferably added to the zeolite beta reaction mixture, rather than to the solution from which the source of silicon, the silicate precipate, is formed.

To eliminate mordenite and ZSM-5 production in the synthesis of the invention, the $TEA_2O/SiO_2$ ratio should be at least about 0.14. Crystallization can be undertaken at static, but preferably stirred, conditions in for example stainless steel autoclaves. At temperatures of 200° to 400° F. crystallization can take from 2-3 hours to 150 days. Zeolite beta crystals can be separated from the reaction mixture by filtration mixture employed and the crystallization conditions. In all cases, synthesis of the desired crystals may be facilitated by the presence of at least 0.001 percent, preferably at least 0.10 percent and still more preferably at least 1.0 percent, seed crystals (based on total solids) of a previously prepared crystalline product. The source of seeds may be slurry from a previous crystallization, processed or unprocessed, recycled to the crystallizer vessel.

Ion exchange of the zeolite beta can be conducted to effect ammonium exchange at acidic sites. The source of the ammonium ion is not critical; thus the source can be ammonium hydroxide or an ammonium salt such as ammonium nitate, ammonium sulfate, ammonium chloride and mixtures thereof. These reagents are usually in aqueous solutions; by way of illustration, aqueous solutions of 1N $NH_4OH$, 1N $NH_4NO_3$, 1N $NH_4Cl$ and 1N $NH_4Cl/NH_4OH$ have been used to effect ammonium ion exchange on these, and similar materials. The pH of the ion exchange is not critical but generally maintained at 7 to 12. Ammonium exchange may be conducted for a period of time ranging from about 0.5 to about 20 hours at a temperature ranging from ambient up to about 100° C. The ion exchange may be conducted in multiple stages. Calcination of the ammonium exchanged product will produce the zeolite in its acid form. Calcination can be effected at temperatures up to about 600° C.

In the case of many catalysts, it is desired to incorporate the zeolite beta hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the zeolite beta, i.e. combined therewith, which is active, may enhance the conversion and/or selectivity of the catalyst in certain organic conversion processes. Inactive mateials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good physical strength, because in petroleum refinery processing, the catalyst is often subjected to conditions, which tend to break the catalyst down into powder-like materials which cause problems in processing.

Naturally occurring clays which can be composited with the hereby synthesized zeolite beta include the montmorillonite and kaolin families which include the sub bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite beta catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline silicate and inorganic oxide gel matrix vary widely with the crystalline silicate content ranging from about 0.1 to about 90 percent by weight, and more usuall in the range of about 10 to about 70 percent by weight of the composite.

In general, organic compounds such as, for example, those selected from the group consisting of hydrocarbons, alcohols and ethers, are converted to conversion products such as, for example, aromatics and lower molecular weight hydrocarbons, over the catalytically active form of the composition of this invention by contact under organic compound conversion conditions including a temperature of from about 100° C. to about 800° C. a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic compound mole ratio of from 0 (no added hydrogen) to about 100.

Such conversion processes include, as non-limiting examples, isomerization, disproportionation, dewaxing (hydrodewaxing), reforming hydrocracking and the like.

EXAMPLES

In the examples TEABr was used as the source of tetraethylammonium. The Examples are tabulated in Table 1 below.

TABLE 1

| Synthesis Mixture | Example 1 | 2 | 3 | 4 | 5 | 6 | 7 | 8 |
|---|---|---|---|---|---|---|---|---|
| $SiO_2$, g | 2100 | 2100 | 2100 | 2100 | 2100 | 4134 | 4137 | 4137 |
| mols | 33.8 | 33.8 | 33.8 | 33.8 | 33.8 | 33.8 | 66.7 | 66.7 |
| $Al_2O_3$, g | 73.6 | 73.6 | 73.6 | 73.6 | 73.6 | 73.6 | 147.2 | 147.2 |
| mol | 0.72 | 0.72 | 0.72 | 0.72 | 0.72 | 0.72 | 1.44 | 1.44 |
| NaOH, g | 325 | 375 | 400 | 425 | 412.5 | 407.5 | 725 | 807 |
| mol | 8.1 | 9.4 | 10 | 10.6 | 10.3 | 10.2 | 18.1 | 20.2 |
| $SO_4^=$, mol | 2.1 | 2.1 | 2.1 | 2.1 | 2.1 | 2.1 | 4.2 | 4.2 |
| $Na_2O$, mol | 2.0 | 2.6 | 2.9 | 3.2 | 2.05 | 3.0 | 4.8 | 5.9 |
| TEABr, g | 1921 | 1921 | 1921 | 1921 | 1921 | 1921 | 3842 | 4485 |
| mol | 9.1 | 9.1 | 9.1 | 9.1 | 9.1 | 9.1 | 18.2 | 21.3 |
| $TEA_2O$, mol | 4.5 | 4.5 | 4.5 | 4.5 | 4.5 | 4.5 | 9.1 | 10.7 |
| $H_2O$, g | 5130 | 5292 | 5310 | 5346 | 5328 | 5328 | 9886 | 11306 |
| $SiO_2/Al_2O_3$ | 47 | 47 | 47 | 47 | 47 | 47 | 46 | 46 |
| $Na_2O/TEA_2O$ | 0.44 | 0.58 | 0.64 | 0.71 | 0.68 | 0.67 | 0.53 | 0.55 |
| $TEA_2O/SiO_2$ | 0.13 | 0.13 | 0.13 | 0.13 | 0.13 | 0.13 | 0.13 | 0.16 |
| $H_2O/TEA_2O$ | 63.3 | 65.3 | 65.5 | 66.0 | 65.8 | 65.8 | 60.3 | 58.7 |
| Product | $\beta$ + 5 | $\beta$ + 5 | $\beta$ + Tr5 | Mainly M + Tr $\beta$ | Mainly $\beta$ Tr M | Mainly $\beta$ Tr M | $\beta$ + Tr5 | $\beta$ |
| Temp, °F. | 280 | 270 | 270 | 270 | 270 | 270 | 290 | 290 |
| Seeding, 5% | | | | | Yes | | | |

N.B. 5 = ZSM-5
M = Mordenite
$\beta$ = Zeolite $\beta$

Pure zeolite Beta, free of mordenite and ZSM-5 biproducts was produced in Example 8. In Example 8 the $TEA_2O/SiO_2$ molar ratio was 0.16 and the $Na_2O/TEA_2O$ molar ratio was 0.55. The reaction mixture for Example 8 contained about 5 weight percent seeds; and the % solids loading of the reaction mixture was about 23%. This high solids loading is achieved by using the silicate precipitate described in Example 9. In zeolite synthesis, using conventionally available sources of silica, the % solids loading is less than 15%.

By comparison to Example 8, it is noted that in Examples 1–7 where $TEA_2/SiO_2$ molar ratios are 0.13 or less, by products, ZSM-5 and mordenite are produced together with the zeolite beta, albeit the biproducts are present in small amounts. One factor which seemd to control biproduct production was the $Na_2O/TEA_2O$ molar ratio. When the $Na_2/TEA_2O$ molar ratio was less than about 0.65, then ZSM-5 biproduct in the zeolite beta is noted. When that molar ratio was greater than about 0.65 mordenite biproduct was produced.

Example 9

The silica precursor, used above in Examples 1–8, continuously precipitated from a solution can be formed as in Examples of Ser. No. 905,102 filed Sept. 8, 1986, set forth herein.

The silica precipitate precursor for zeolite synthesis was produced using the formulations given in Table 1. Processing was in accordance with the flow diagram shown in FIG. 1. The properties of the silica precursor are given in Table 2. The precursor is made in a continuous manner by neutralizing a sodium silicate solution under carefully controlled conditions. The resulting product is a suspension of agglomerated solids in the shape of microspheres. Because of the size and shape, and because primary agglomeration has already taken place, suspensions of these particles exhibit low viscosities at high solids loadings (30%). This is in marked contrast to an equivalent, non-controlled neutralization which results in solid, non-stirrable mass. The particle size of the precursor ranges between 1–500$\mu$ but the average size is 70$\mu$.

TABLE 1
PRECURSOR SYNTHESIS*
Volume Basis

| Silicate Solution | |
|---|---|
| Sodium Silicate (Q-Brand 29% $SiO_2$, 9% $Na_2O$) | 100 |
| 50% NaOH | 1.03 |
| $H_2O$ (Demineralized) | 98.9 |
| Acid Solution | |
| 24% $H_2SO_4$ | 67.0 |

*The two solutions were reacted continuously at 30 min. residence time in a plastic vessel equipped with an overflow and mixer. The vessel was filled with water. The silicate solution and the acid solution are pumped into the vessel in a continuous manner.
The pH was controlled to about 8. The average residence time of the product is 30 minutes, and it is discharged continuously from the vessel by an overflow tube.
The product was collected, filtered and washed with demineralized water to be sulfate free.

TABLE 2
ANALYSES OF WASHED PRECURSOR

| | Wt. Percent |
|---|---|
| Sulfur | 0.005% |
| Silica | 91.3% |
| Alumina | 0.1% |
| Sodium | 1.5% |
| Ash at 1000° F. (542° C.) | 95.53% |

What is claimed is:

1. A process for producing zeolite beta comprising providing a reaction mixture, said reaction mixture having a solids loading of at least 15%, wherein solids loading is defined by the formula $$100\% \times \frac{\text{Weight of Silica and Alumina}}{\text{Weight of Total Reaction Mixture}}$$

wherein the reaction mixture comprises a source of silicon or a source of silicon admixed with a source of aluminum, a source of sodium oxide, water and tetraethylammonium bromide,
    wherein the reaction medium has a composition, expressed in terms of molar ratios of oxides as follows
    $SiO_2/Al_2O_3$: greater than about 10 to 200,
    $H_2O/TEA_2O$: about 20 to 150,
    $Na_2O/TEA_2O$: about 0 to 1, $TEA_2O/SiO_2$: about 0.01 to 1,
wherein the particle size of said source of silicon ranges from about 1 to about 500 microns,
wherein TEA is tetraethylammonium,
maintaining the reaction mixture at about 200 to about 400 F., to produce said zeolite beta and recovering said zeolite,
wherein said source of silicon is formed by providing a solution of a silicate;
providing a precipitating reagent which is effective to precipitate said silicate as silica from said solution;
maintaining the molar ratio of said silicate to precipitating reagent at least substantially constant and continuously contacting said solution with said precipitating reagent to effect formation of insoluble silica precipitate, whereby the particle size of said silica precipitate ranges from about 1 to about 500 microns.

2. The process of claim 1, wherein $TEA_2O/SiO_2$ is greater than 0.13.

3. The process of claim 1, wherein $TEA_2O/SiO_2$ is at least about 0.14.

4. The process of claim 1, wherein the % solids loading is at least about 20%.

5. The process of claim 1, wherein said temperature ranges from about 200° to 300° F.

6. The process of claim 1, wherein the $Na_2O/TEA_2O$ molar ratio was less than about 0.65.

7. The process of claim 1, wherein the $Na_2O/TEA_2O$ molar ratio was greater than about 0.65.

8. The process of claim 2, wherein the $Na_2O/TEA_2O$ molar ratio was 0.55.

* * * * *

UNITED STATES PATENT AND TRADEMARK OFFICE
CERTIFICATE OF CORRECTION

PATENT NO. : 4,847,055

DATED : July 11, 1989

INVENTOR(S) : Yung F. Chu

It is certified that error appears in the above-identified patent and that said Letters Patent is hereby corrected as shown below:

Title: Change the title to read "Zeolite Beta Production"

Signed and Sealed this

Twenty-first Day of January, 1992

Attest:

HARRY F. MANBECK, JR.

Attesting Officer

Commissioner of Patents and Trademarks